United States Patent
Shen

(10) Patent No.: US 7,849,125 B2
(45) Date of Patent: Dec. 7, 2010

(54) EFFICIENT COMPUTATION OF THE MODULO OPERATION BASED ON DIVISOR ($2^n-1$)

(75) Inventor: Qiang Shen, San Diego, CA (US)

(73) Assignee: VIA Telecom Co., Ltd (KY)

( * ) Notice: Subject to any disclaimer, the term of this patent is extended or adjusted under 35 U.S.C. 154(b) by 1187 days.

(21) Appl. No.: 11/456,110

(22) Filed: Jul. 7, 2006

(65) Prior Publication Data
US 2008/0010332 A1 Jan. 10, 2008

(51) Int. Cl.
*G06F 7/72* (2006.01)
(52) U.S. Cl. .................................................. 708/491
(58) Field of Classification Search .................... None
See application file for complete search history.

(56) References Cited

U.S. PATENT DOCUMENTS

| | | |
|---|---|---|
| 4,598,266 A | 7/1986 | Bernardson |
| 4,658,094 A | 4/1987 | Clark |
| 4,686,510 A | 8/1987 | Baker |
| 4,722,067 A | 1/1988 | Williams |
| 4,742,479 A | 5/1988 | Kloker et al. |
| 4,742,520 A | 5/1988 | Hoac et al. |
| 4,800,524 A | 1/1989 | Roesgen |
| 4,833,602 A | 5/1989 | Levy et al. |
| 4,870,607 A | 9/1989 | Ishizuka |
| 4,891,781 A | 1/1990 | Omura |
| 4,935,867 A | 6/1990 | Wang et al. |
| 4,994,994 A | 2/1991 | Burgess et al. |
| 5,008,849 A | 4/1991 | Burgess et al. |
| 5,038,376 A | 8/1991 | Mittenthal |
| 5,210,710 A | 5/1993 | Omura |
| 5,233,553 A | 8/1993 | Shak et al. |
| 5,249,148 A | 9/1993 | Catherwood et al. |

(Continued)

FOREIGN PATENT DOCUMENTS

EP 0318957 6/1989

(Continued)

OTHER PUBLICATIONS

Reto Zimmermann. "Efficient VLSI Implementation of Modulo ($2^n+1$) Addition and Multiplication." Swiss Federal Institute of Technology (ETH). Integrated Systems Laboratory, CH-8092 Zurich, Switzerland.

(Continued)

*Primary Examiner*—David H Malzahn
(74) *Attorney, Agent, or Firm*—James W. Huffman

(57) ABSTRACT

A system and method for computing A mod ($2^n-1$), where A is an m bit quantity, where n is a positive integer, where m is greater than or equal to n. The quantity A may be partitioned into a plurality of sections, each being at most n bits long. The value A mod ($2^n-1$) may be computed by adding the sections in mod($2^n-1$) fashion. This addition of the sections of A may be performed in a single clock cycle using an adder tree, or, sequentially in multiple clock cycles using a two-input adder circuit provided the output of the adder circuit is coupled to one of the two inputs. The computation A mod ($2^n-1$) may be performed as a part of an interleaving/deinterleaving operation, or, as part of an encryption/decryption operation.

24 Claims, 9 Drawing Sheets m=35, n=4, c=ceiling(m/n)=9, $n_L$=ceiling($\log_2 c$)=4

U.S. PATENT DOCUMENTS

| | | | |
|---|---|---|---|
| 5,257,272 | A | 10/1993 | Fredrickson |
| 5,289,397 | A | 2/1994 | Clark et al. |
| 5,345,410 | A | 9/1994 | Yokoyama et al. |
| 5,381,360 | A | 1/1995 | Shridhar et al. |
| 5,384,810 | A | 1/1995 | Amrany |
| 5,414,651 | A | 5/1995 | Kessels |
| 5,440,705 | A | 8/1995 | Wang et al. |
| 5,479,511 | A | 12/1995 | Naccache |
| 5,493,522 | A | 2/1996 | Rosenberg |
| 5,572,454 | A | 11/1996 | Lee et al. |
| 5,606,520 | A | 2/1997 | Gove et al. |
| 5,633,814 | A | 5/1997 | Palaniswami |
| 5,649,146 | A | 7/1997 | Riou |
| 5,659,700 | A | 8/1997 | Chen et al. |
| 5,664,193 | A | 9/1997 | Tirumalai |
| 5,719,798 | A | 2/1998 | Lutz et al. |
| 5,790,443 | A | 8/1998 | Shen et al. |
| 5,793,660 | A | 8/1998 | Rentschler |
| 5,794,025 | A | 8/1998 | Bergantino et al. |
| 5,809,308 | A | 9/1998 | Tirumalai |
| 5,867,711 | A | 2/1999 | Subramanian et al. |
| 5,905,665 | A | 5/1999 | Rim |
| 5,918,252 | A | 6/1999 | Chen et al. |
| 5,940,863 | A | 8/1999 | Fimoff et al. |
| 5,982,900 | A | 11/1999 | Ebihara et al. |
| 6,038,318 | A | 3/2000 | Roden |
| 6,047,364 | A | 4/2000 | Kolagotla et al. |
| 6,049,858 | A | 4/2000 | Kolagotla et al. |
| 6,052,768 | A | 4/2000 | Rim |
| 6,064,740 | A | 5/2000 | Curiger et al. |
| 6,073,228 | A | 6/2000 | Holmqvist et al. |
| 6,182,104 | B1 | 1/2001 | Foster et al. |
| 6,282,255 | B1 | 8/2001 | La Rosa et al. |
| 6,304,398 | B1 | 10/2001 | Gaub et al. |
| 6,321,247 | B1 | 11/2001 | Matthews et al. |
| 6,341,370 | B1 | 1/2002 | Tirumalai et al. |
| 6,448,915 | B1 | 9/2002 | Logue |
| 6,536,001 | B1 | 3/2003 | Cai et al. |
| 6,584,556 | B1 | 6/2003 | Witt |
| 6,591,213 | B1 | 7/2003 | Burlison |
| 6,604,169 | B2 | 8/2003 | Catherwood |
| 6,634,024 | B2 | 10/2003 | Tirumalai et al. |
| 6,651,247 | B1 | 11/2003 | Srinivasan |
| 6,671,878 | B1 | 12/2003 | Bliss |
| 6,707,627 | B1 | 3/2004 | Reed et al. |
| 6,728,743 | B2 | 4/2004 | Shachar |
| 6,832,370 | B1 | 12/2004 | Srinivasan et al. |
| 6,839,648 | B1 | 1/2005 | Burlison |
| 6,900,910 | B1 | 5/2005 | Ganapahti et al. |
| 6,963,645 | B2 * | 11/2005 | Chen et al. ............. 380/30 |
| 6,973,470 | B2 | 12/2005 | Takahashi et al. |
| 6,986,131 | B2 | 1/2006 | Thompson et al. |
| 6,993,757 | B2 | 1/2006 | Rajagopalan |
| 2002/0007484 | A1 | 1/2002 | Tirumalai et al. |
| 2002/0124039 | A1 | 9/2002 | Inoue et al. |
| 2002/0129074 | A1 | 9/2002 | Shachar |
| 2002/0194237 | A1 | 12/2002 | Takahashi et al. |
| 2002/0194452 | A1 | 12/2002 | Catherwood |
| 2003/0031316 | A1 | 2/2003 | Langston et al. |
| 2003/0056080 | A1 | 3/2003 | Watanabe |
| 2003/0065697 | A1 | 4/2003 | Patel et al. |
| 2003/0074382 | A1 | 4/2003 | Schmandt et al. |
| 2003/0112969 | A1 | 6/2003 | Algesheimer et al. |
| 2003/0208749 | A1 | 11/2003 | Rajagopalan |
| 2003/0225958 | A1 | 12/2003 | Efland et al. |
| 2003/0233643 | A1 | 12/2003 | Thompson et al. |
| 2004/0003022 | A1 | 1/2004 | Garrison et al. |
| 2004/0003340 | A1 | 1/2004 | Chen et al. |
| 2004/0083251 | A1 | 4/2004 | Geiringer et al. |
| 2004/0128339 | A1 | 7/2004 | Kalampoukas et al. |
| 2004/0199560 | A1 * | 10/2004 | Dupaquis et al. ............. 708/492 |
| 2004/0221283 | A1 | 11/2004 | Worley |
| 2004/0268335 | A1 | 12/2004 | Martin et al. |
| 2005/0004967 | A1 | 1/2005 | Becker |
| 2005/0027776 | A1 | 2/2005 | Lou |
| 2005/0185791 | A1 * | 8/2005 | Chen et al. ................. 380/30 |
| 2005/0223052 | A1 | 10/2005 | Schimmler et al. |
| 2005/0256996 | A1 | 11/2005 | Watanabe |
| 2005/0278572 | A1 | 12/2005 | Busaba et al. |
| 2006/0010191 | A1 | 1/2006 | Takahashi et al. |
| 2006/0015553 | A1 | 1/2006 | Takahashi et al. |
| 2006/0045263 | A1 | 3/2006 | Brokenshire et al. |
| 2006/0048123 | A1 | 3/2006 | Martin |
| 2006/0048124 | A1 | 3/2006 | Martin |

FOREIGN PATENT DOCUMENTS

| | | |
|---|---|---|
| FR | 2786579 | 6/2000 |

OTHER PUBLICATIONS

Parhami, Behrooz. "Computer Arithmetic: Algorithms and Hardware Designs." Oxford University Press. Jul. 2, 2000. pp. 125-128.

Ranada, Abhiram G. et al. "Interconnection Networks and Parallel Memory Organizations for Array Processing." Proceedings of the International Conference on Parallel Processing. Aug. 20-23, 1985. Washington, IEEE Comp. Soc Press, US, pp. 41-47. XP000757117.

Sivakumar, R. et al. "VLSI Design of a Modulo-Extractor." Communications, Computers and Signal Processing. 1991. IEEE Pacific Rim Conference on Victoria, BC, Canada. May 9-10, 1991. pp. 327-330. XP010039443. ISBN: 0-87942-638-1.

* cited by examiner $m=35$, $n=4$, $c=\text{ceiling}(m/n)=9$, $n_L=\text{ceiling}(\log_2 c)=4$ $m=35$, $n=4$, $c=\text{ceiling}(m/n)=9$, $n_L=\text{ceiling}(\log_2 c)=4$ $m=15$, $n=3$, $c=\text{ceil}(m/n)=5$, $n_L=\text{ceil}(\log_2 c)=3$ perform a number of addition operations in a sequence of stages, where each of the stages includes performing a corresponding subset of the number of addition operations in a parallel fashion     1050 select either the value zero or the output data from a last of the stages depending on a comparison of the value $(2^n-1)$ and the output data from the last stage, where the selected value equals A mod $(2^n-1)$     1055

Fig. 10B perform a number of addition operations in a sequence of stages, where each of the stages includes performing a corresponding subset of the number of addition operations in a parallel fashion     1050 select either the value zero or the output data from a last of the stages depending on a comparison of the value $(2^n-1)$ and the output data from the last stage, where the selected value equals A mod $(2^n-1)$     1055 generate a read address using the selected value     1057 read a data symbol from a data buffer using the read address.     1059

Fig. 10C

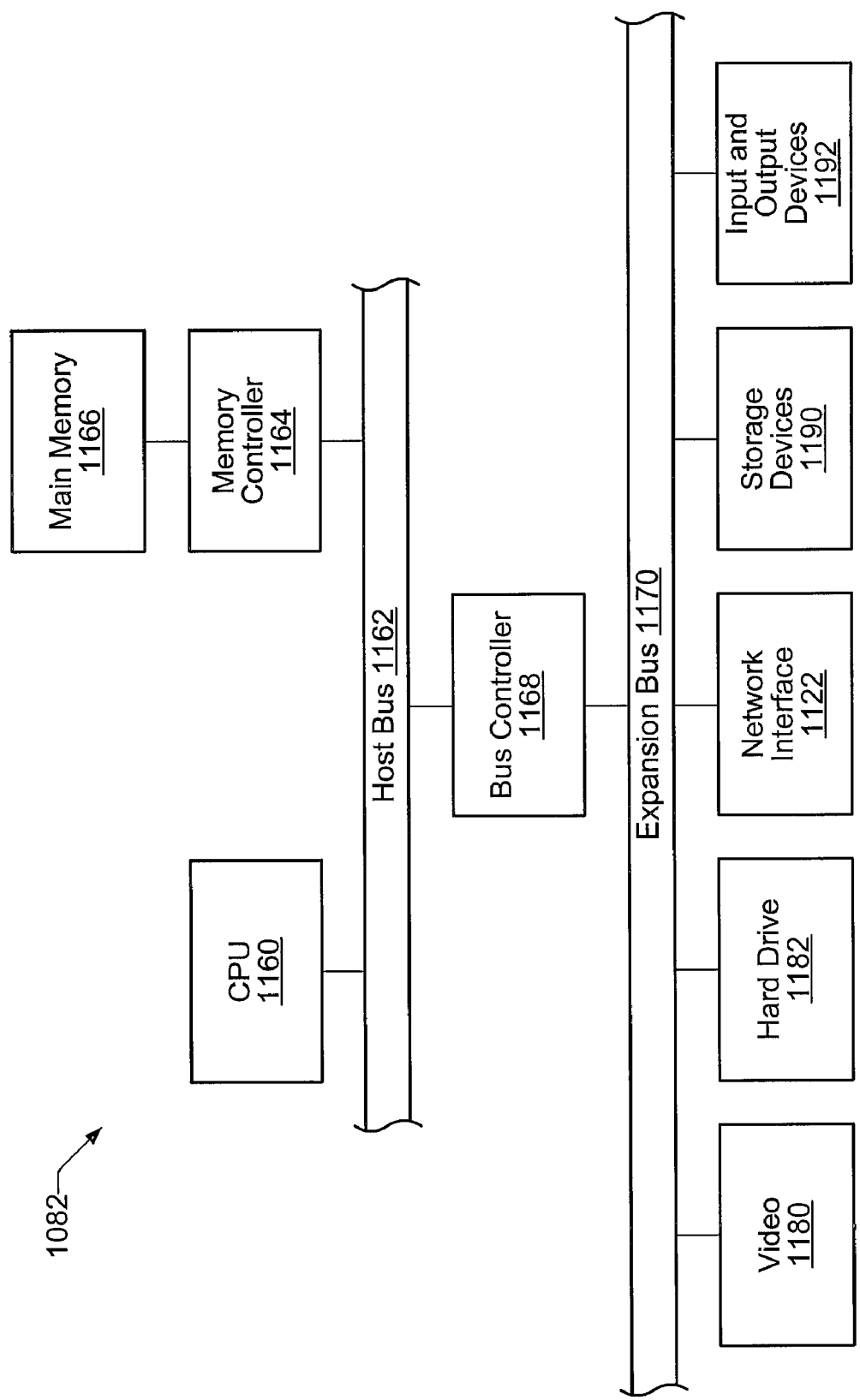

EFFICIENT COMPUTATION OF THE MODULO OPERATION BASED ON DIVISOR $(2^n-1)$

FIELD OF THE INVENTION

The present invention relates generally to the field of fixed-point arithmetic realizations, more specifically, to systems and methods for computing A mod $(2^n-1)$.

DESCRIPTION OF THE RELATED ART

As used herein the expression "x mod r", where x is an integer and r is a positive integer, is defined as the nonnegative integer y, less than r, in the set $\{x-kr: k \in Z\}$, where Z represents the set of integers. For example, 8 mod 5 equals 3. As another example, 101 mod 10 equals 1. When x is positive, "x mod r" may be interpreted as the remainder resulting from the division of x by r.

There are many situations in which A mod $(2^n-1)$ needs to be computed, where A is an m bit binary word, where m and n are positive integers. For example, A mod $(2^n-1)$ needs to be computed when performing data interleaving or deinterleaving according to the CDMA2000 High Rate Packet Data Air Interface Specification, 3GPP2 C.S0024-A, Ver2.0, July 2005.

When m is less than n, A mod $(2^n-1)$ is simply A itself. Thus, in the case m<n, the computation of A mod $(2^n-1)$ is trivial.

When m is greater than or equal to n, the computation of A mod $(2^n-1)$ is nontrivial.

Reto Zimmermann discloses a method for the computation of X mod $(2^n-1)$ in the case where X is (n+1) bits in length, i.e., the case m=n+1. See the paper entitled "Efficient VLSI implementation of modulo $(2^n\pm1)$ addition and multiplication," published in the Proceedings of 14th IEEE Symposium on Computer Arithmetic, 1999. However, Zimmermann's method does not generalize to other values of m.

Thus, there exists a need for circuits, systems and methods for computing A mod $(2^n-1)$ in the case where m is greater than or equal to n.

SUMMARY OF THE INVENTION

In one set of embodiments, a system for computing A mod $(2^n-1)$, where A is an m-bit quantity, where m is an integer greater than or equal to two, where n is a positive integer less than or equal to m, may include a plurality of adder circuits. Each of the adder circuits may be configured to operate on two n-bit operands in order to produce an n-bit output. The plurality of adder circuits may be coupled to form a tree structure. The quantity A is partitioned into a plurality of sections, where each of the sections includes up to n consecutive bits of the quantity A. Each of the sections may be supplied to exactly one of the adder circuits to determine one of the two n-bit input operands of that adder circuit.

Each of the adder circuits may include: a first n-bit adder configured to operate on the two n-bit operands in order to produce an intermediate n-bit result; and a second n-bit adder configured to operate on the intermediate n-bit result and on a carryout signal from the first n-bit adder in order to produce the n-bit output.

In another set of embodiments, a system for computing A mod $(2^n-1)$, where A is an m-bit quantity, where m is an integer greater than or equal to two, where n is a positive integer less than or equal to m, may include an adder circuit. The adder circuit may be configured to operate on two n-bit inputs and to produce an n-bit output. The output of the adder circuit may be coupled to a first of the two inputs.

The adder circuit may include: a first n-bit adder configured to operate on the two n-bit operands in order to produce an intermediate n-bit result; and a second n-bit adder configured to operate on the intermediate n-bit result and on a carryout signal from the first n-bit adder in order to produce the n-bit output.

A plurality of sections of the quantity A may be presented to a second of the two inputs in a plurality of cycles (of a clock signal) respectively. Each of the sections may include up to n consecutive bits of the quantity A.

In yet another set of embodiments, a method for computing A mod $(2^n-1)$, where A is an m-bit quantity, where m is an integer greater than or equal to two, where n is a positive integer less than or equal to m, may involve:
  (a) receiving the m-bit quantity A;
  (b) extracting a section of the quantity A, where the section includes up to n consecutive bits of the quantity A;
  (c) adding the section to a value of a register;
  (d) adding one to the register value if the register value is greater than $2^n-1$, where said adding of one is performed modulo $2^n$;
  (e) repeating (b), (c) and (d) until the quantity A is exhausted; and
  (f) setting the register value equal to zero if the register value equals $2^n-1$.

In yet another set of embodiments, a method for computing A mod $(2^n-1)$, where A is an m-bit quantity, where m is an integer greater than or equal to two, where n is a positive integer less than or equal to m, may include:
  (1) in each of a plurality of stages, operating on a corresponding set of n-bit input operands to generate a corresponding set of one or more n-bit output operands, where said operating includes performing one or more addition operations in parallel;
  (2) selecting either the value zero or a first of the one or more output operands from a last of the stages depending on a comparison between the value $(2^n-1)$ and the first output operand from the last of the stages.

The selected value represents A mod $(2^n-1)$. In each stage, each of the one or more addition operations may operate on a corresponding two of the set of n-bit input operands of the stage to generate a corresponding one of the set of n-bit output operands of the stage.

In a first of the stages, the set of n-bit input operands are determined by a plurality of sections of the quantity A respectively. Each of the sections includes at most n consecutive bits of the quantity A. In each of the stages except for the first stage, the set of n-bit input operands includes one or more n-bit output operands supplied from one or more previous ones of the stages.

In each of the stages, each of the one or more addition operations includes: adding the corresponding two n-bit input operands to form an n-bit intermediate result and a carryout; and adding the n-bit intermediate result and the carryout to form the corresponding n-bit output operand.

Any of the various method embodiments disclosed herein (or any combinations thereof or portions thereof) may be implemented in terms of program instructions. The program instructions may be stored in (or on) any of various memory media. A memory medium is a medium configured for the storage of information. Examples of memory media include various kinds of magnetic media (e.g., magnetic tape, magnetic disk, magnetic strips, magnetic film); various kinds of optical media (e.g., CD-ROM); various kinds of semiconductor RAM and ROM; various media based on the storage of electrical charge or other physical quantities; etc.

Furthermore, various embodiments of a system including a memory and a processor are contemplated, where the memory is configured to store program instructions and the processor is configured to read and execute the program instructions from the memory. In various embodiments, the program instructions encode corresponding ones of the method embodiments described herein (or combinations thereof or portions thereof).

BRIEF DESCRIPTION OF THE DRAWINGS

The following detailed description makes reference to the accompanying drawings, which are now briefly described.

FIG. 10B illustrates one embodiment of a method (e.g., a computer-implemented method) for computing A mod $(2^n-1)$ in a plurality of stages, each including a number of parallel addition operations.

FIG. 10C illustrates one embodiment of a method (e.g., a computer-implemented method) for accessing a data symbol from memory as part of an interleaving operation or deinterleaving operation.

FIG. 11 illustrates one embodiment of a computer system for computing A mod $(2^n-1)$ on an m bit quantity A.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this specification, the word "may" is used in a permissive sense (i.e., in the sense of "having the potential to"), rather than in the mandatory sense (i.e., in the sense of "must"). Furthermore, the phrase "A includes B" is used to mean "A includes B, but is not limited to B".

DETAILED DESCRIPTION OF THE INVENTION

Let A<m> denote an m-bit binary word, where m is an integer greater than or equal to two.

Let n be a positive integer less than or equal to m.

Let $k=\lfloor m/n \rfloor$, where $\lfloor x \rfloor$ denotes the floor of x, i.e., the greatest integer which is less than or equal to x. In other words, k is the result of dividing m by n and then rounding down to the nearest integer.

Observe that the m-bit word A<m> can be represented as a concatenation of k consecutive n-bit sections and a terminal section having (m−kn) bits:

$$A<m>=A_k<m-kn>A_{k-1}<n>A_{k-2}<n>\ldots A_1<n>A_0<n>. \quad (1)$$

In general, the notation X<r> is meant to indicate an r-bit binary word X.

The value of the binary word A can be expressed in terms of the values of the sections as follows:

$$A=A_k 2^{kn}+A_{k-1}2^{(k-1)n}+A_{k-2}2^{(k-2)n}+\ldots+A_1 2^n+A_0. \quad (2)$$

It is a basic mathematical fact that $2^n$ mod $(2^n-1)=1$. Furthermore, $$2^{jn} \bmod (2^n-1)=1$$

where j is any non-negative integer.

Thus, it follows that $$A \bmod(2^n-1)=(A_k+A_{k-1}+A_{k-2}+\ldots+A_1+A_0)\bmod(2^n-1). \quad (3)$$

Figure 1A:
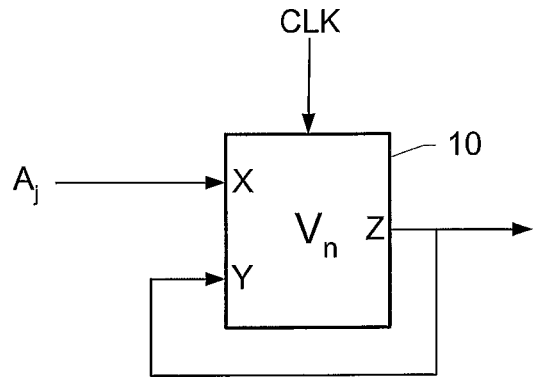
FIG. 1A illustrates an adder circuit employing feedback in order to compute A mod $(2^n-1)$ in a number of clock cycles.

Therefore, given an adder circuit $V_n$ that implements the computation X+Y mod $(2^n-1)$ on two n-bit quantities X and Y to produce an n-bit output Z, the computation of A modulo $(2^n-1)$ may be implemented in a sequential fashion as suggested by FIG. 1A. The quantities $A_0, A_1, A_2, \ldots, A_{k-1}, A_k$ may be supplied to the X input of the adder circuit $V_n$ in successive cycles of the clock signal CLK. The output Z of the adder circuit $V_n$ may be fed back to the input Y so that the adder circuit $V_n$ implements the iterative computation:

$$Z_j=A_j+Z_{j-1} \bmod(2^n-1) \quad (4)$$

for j=0, 1, 2, . . . , k. The output $Z_k$ from the last cycle represents A mod $(2^n-1)$. Because addition (based on any modulus) is both commutative and associative, the order of presentation of the quantities $A_0, A_1, A_2, \ldots, A_{k-1}, A_k$ to the adder circuit $V_n$ does not matter so far as the final output is concerned.

Figure 1B:
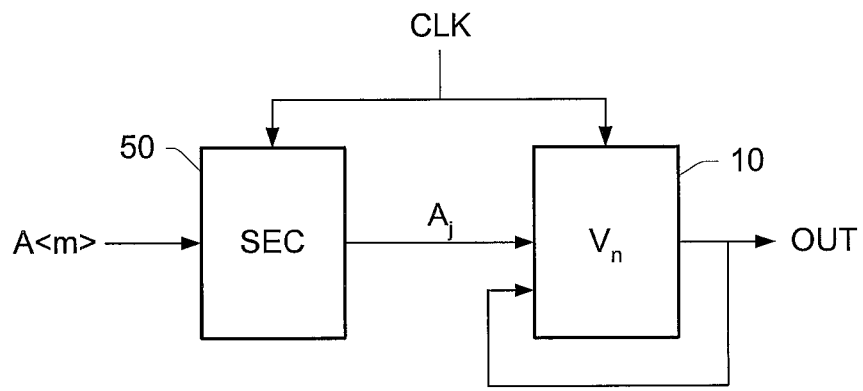
FIG. 1B illustrates one embodiment of a system configured to extract sections of an m-bit quantity A and to operate on the sections in order to compute A mod $(2^n-1)$ in a number of clock cycles.

In some embodiments, a section extraction circuit SEC may be provided to extract the quantities $A_0, A_1, A_2, \ldots, A_{k-1}, A_k$ from the binary word A and to present the quantities $A_0, A_1, A_2, \ldots, A_{k-1}, A_k$ to the adder circuit $V_n$ in successive clock cycles, e.g., as suggested in FIG. 1B.

Figure 1C:
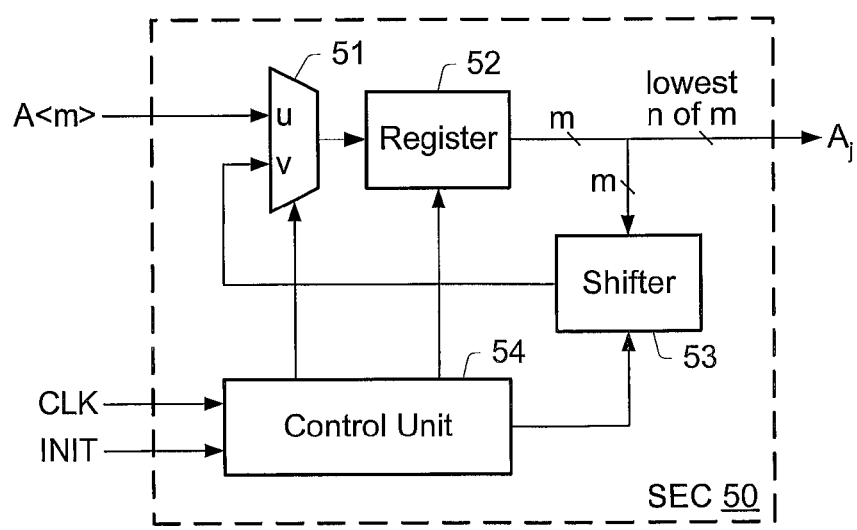
FIG. 1C one embodiment of a circuit configured to extract successive sections of the quantity A.

The section extraction circuit may include a multiplexer 51, an m-bit register 52, a shift unit 53 and a control unit 54 as illustrated in FIG. 1C. In a first clock cycle, the multiplexer 51 may initially select the m-bit binary word A and forward the binary word A to the m-bit register 52. Register 52 receives and stores the binary word A. The m-bit output of the register 52 is provided to the shift unit 53. The least significant n bits of the register output may be interpreted as the output of the section extraction unit SEC. The shift unit 53 receives the m-bit output of the register 52 and shifts the register output by n-bits to the right in order to generate a shifted value. In a second clock cycle, the control unit 54 directs multiplexer 51 to select the shifted value from the shift unit 53. Thus, the shifted value gets stored in register 52 and gets shifted again by shift unit 53. In a third clock cycle, the control unit 54 directs multiplexer 51 to select the doubly shifted value. In every clock cycle after the first clock cycle the control unit 54 may direct the multiplexer to select the output of the shift unit. Therefore, in successive clock cycles, successive ones of the sections $A_0, A_1, A_2, \ldots, A_{k-1}, A_k$ will appear at the output of the section extraction unit SEC. The control unit 54 may receive the clock signal CLK and control the selection action of the multiplexer 51, the storage action of the register 52, and the shifting action of the shift unit 53. For example, the control unit may induce the register 52 to capture data on rising edges of the clock CLK and induce the shift unit 53 to perform the shifting action on falling edges of the clock CLK. The control unit 54 may reinitialize itself, in anticipation of the next binary word A to be processed, in response to the assertion of an initialization signal INIT.

If m is a multiple of n, the value (m−kn) equals zero, and thus, the quantity $A_k$ is vacuous. Therefore, in this case, only the quantities $A_0, A_1, A_2, \ldots, A_{k-1}$ need be presented to the adder circuit $V_n$, and the computation of A mod $(2^n-1)$ may be completed in k computational cycles.

Figure 2A:
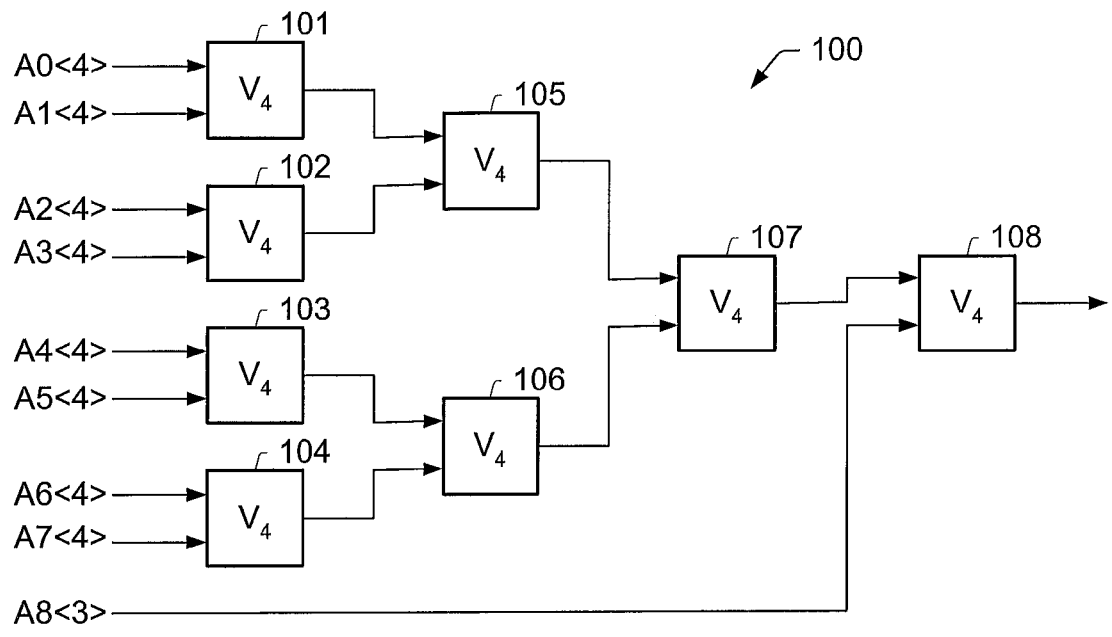
FIG. 2A illustrates one embodiment of an adder tree configured to compute A mod $(2^n-1)$ in the case m=35 and n=4.

In one set of embodiments, the computation of A modulo $(2^n-1)$ may be implemented, e.g., in one clock cycle, by an adder tree formed from copies of the adder circuit $V_n$. FIG. 2A illustrates one embodiment of an adder tree 100 configured for the case m=35 and n=4. The adder tree 100 has four stages including eight copies of the adder circuit $V_4$. In the first stage, adder circuits 101, 102, 103 and 104 each receive a corresponding pair of the 4-bit quantities $A_0, A_1, A_2, \ldots, A_7$. The 4-bit outputs of these adder circuits are fed to adder circuits 105 and 106 of the second stage. In particular, adder circuits 101 and 102 feed adder circuit 105, while adder circuits 103 and 104 feed adder circuit 106. The 4-bit outputs of adder circuits 105 and 106 feed adder circuit 107 of the third stage. The adder circuit 108 of the fourth stage receives the 4-bit output of adder circuit 107 and also receives the 3-bit quantity $A_8$, the only quantity that didn't get consumed in the first stage. The 4-bit output of adder circuit 108 represents the result A mod $(2^4-1)$, i.e., A mod 15.

In general, the number c of inputs to the adder tree is given by:

$$c = \lceil m/n \rceil,$$

where $\lceil x \rceil$ denotes the ceiling of x. Furthermore, the number $n_L$ of levels in the adder tree is given by the expressions:

$$d = \log_2 c$$

$$n_L = \lceil d \rceil.$$

In other words, the adder tree depth $n_L$ equals the ceiling of the base-2 logarithm of the ceiling of m/n. For example, in the case illustrated in FIG. 2A, m=35 and n=4. Thus, c=9, d=3.17 and $n_L=4$.

In general, whenever the number c is not even, one of the c quantities supplied as input to the adder tree will remain unconsumed in the first stage. This quantity is referred to herein as the "first stage remainder". In the adder tree 100 of FIG. 2A, the quantity $A_8$ is the first stage remainder.

Figure 2B:
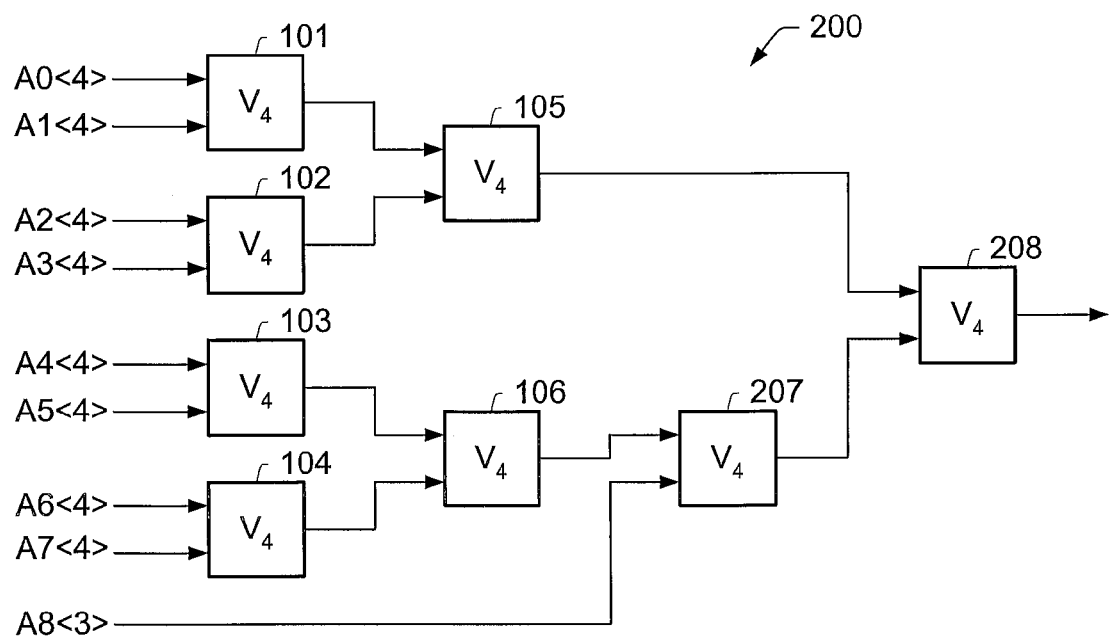
FIG. 2B illustrates another embodiment of an adder tree configured to compute A mod $(2^n-1)$ in the case m=35 and n=4.

It is not essential that the consumption of the first-stage remainder be deferred until the last stage. For example, FIG. 2B illustrates an embodiment of an adder tree 200 where the first-stage remainder (quantity $A_8$) is consumed by an adder circuit 207 in the third stage. In the first two stages, the adder tree 200 has a structure similar to the structure of the adder tree 100. The quantity $A_8$ and the output of adder circuit 106 are fed to adder circuit 207. The outputs of adder circuits 105 and 207 are fed to adder circuit 208.

Figure 3A:
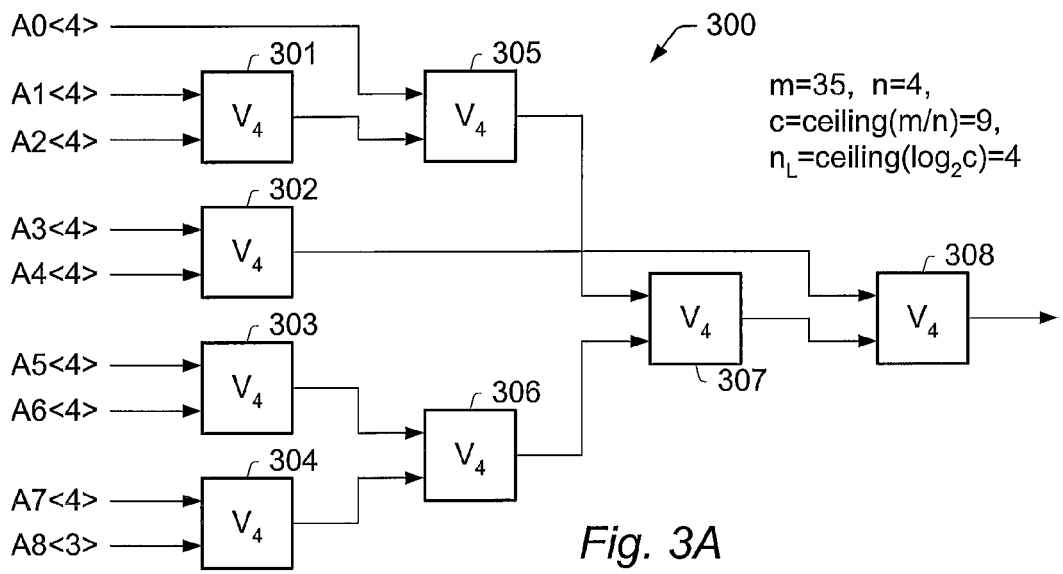
FIG. 3A illustrates yet another embodiment of an adder tree configured to compute A mod $(2^n-1)$ in the case m=35 and n=4.

Moreover, it is not essential that the last quantity ($A_8$ in the examples above) be the first-stage remainder. In general, any of the quantities $A_0, A_1, A_2, \ldots, A_{c-1}$ can be the first-stage remainder. For example, FIG. 3A illustrates an embodiment of an adder tree 300 where the quantity $A_0$ is the first-stage remainder. In the first stage, each of adder circuits 301, 302, 303 and 304 receive a corresponding pair of the quantities $A_1, A_2, A_3, \ldots, A_8$. Adder circuit 305 of the second stage is supplied with quantity $A_0$ and the output of adder circuit 301 from the first stage. The outputs of adder circuits 305 and 306 are supplied to adder circuit 307. The outputs of adder circuit 302 and 307 are fed to adder circuit 308.

Figure 3B:
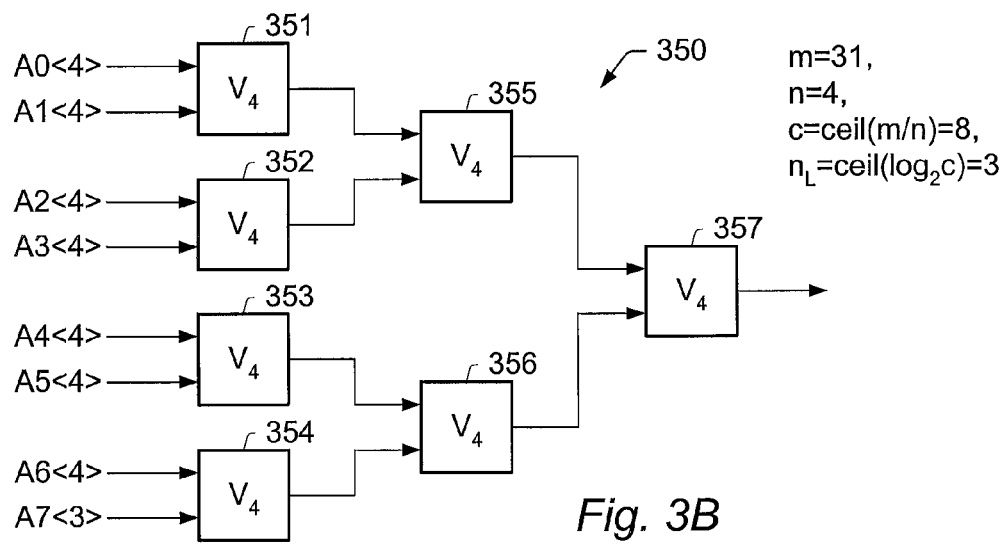
FIG. 3B illustrates one embodiment of an adder tree configured to compute A mod $(2^n-1)$ in the case m=31 and n=4.

Furthermore, when c is even, there need not be a first-stage remainder, i.e., all the quantities may be consumed in the first stage. For example, FIG. 3B illustrates an embodiment of an adder tree 350 configured for the case m=31 and n=4. Because c=ceiling(m/n)=8, each of the quantities $A_0, A_1, A_2, A_3, \ldots, A_7$ may be consumed in the first stage. Each of the adder circuits 351, 352, 353 and 354 receives a corresponding pair of the quantities $A_0, A_1, A_2, A_3, \ldots, A_7$. Adder circuit 355 receives the outputs of adder circuits 351 and 352. Adder circuit 356 receives the outputs of adder circuits 353 and 354. Adder circuit 357 receives the outputs of adder circuits 355 and 356.

Figure 3C:
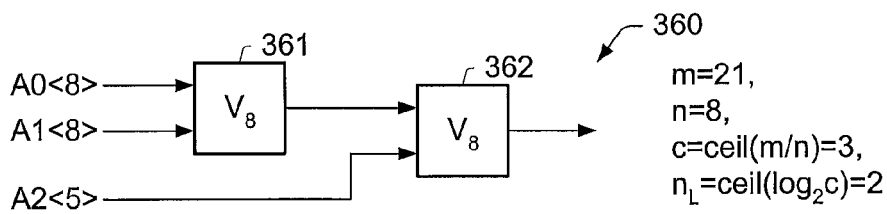
FIG. 3C illustrates one embodiment of an adder tree configured to compute A mod $(2^n-1)$ in the case m=21 and n=8.

In some embodiments, an adder tree may include only two copies of the adder circuit $V_n$. For example, FIG. 3C illustrates an embodiment of an adder tree 360 configured for the case m=21 and n=8. Adder tree 360 includes adder circuits 361 and 362. The adder circuit 361 receives the 8-bit quantities $A_0$ and $A_1$. The adder circuit 362 receives the 8-bit output of the adder circuit 361 and also receives the 5-bit quantity $A_2$.

Figure 3D:
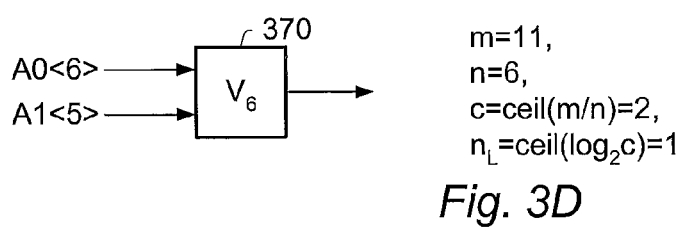
FIG. 3D illustrates one embodiment of an adder tree configured to compute A mod $(2^n-1)$ in the case m=11 and n=6.

In some embodiments, an adder tree may include only one copy of the adder circuit $V_n$. For example, FIG. 3D illustrates an embodiment of an adder tree configured for the case m=11 and n=6, having only one adder circuit 370. Adder circuit 370 receives the quantities $A_0$ and $A_1$.

Figure 4:
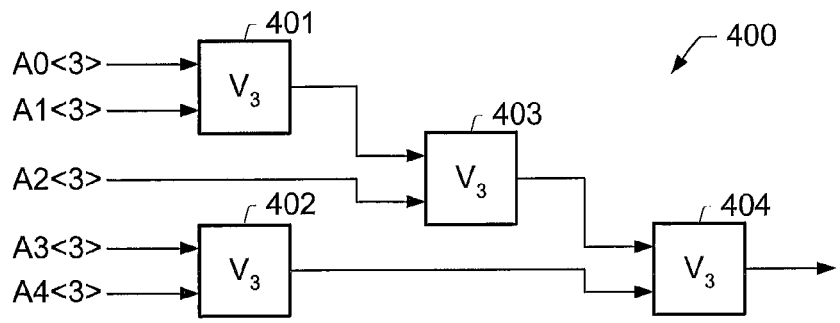
FIG. 4 illustrates one embodiment of an adder tree configured to compute A mod $(2^n-1)$ in the case m=15 and n=3.

In the case that m is a multiple of n, the quantity $A_k$ is vacuous since (m−kn) equals zero. Thus, expressions (1) and (3) reduce to:

$$A<m> = A_{k-1}<n>A_{k-2}<n>\ldots A_1<n>A_0<n>, \qquad (5)$$

$$A \bmod (2^n-1) = (A_{k-1}+A_{k-2}+\ldots+A_1+A_0) \bmod (2^n-1), \qquad (6)$$

i.e., the vacuous quantity $A_k$ is simply omitted. For example, FIG. 4 illustrates an embodiment of an adder tree 400 configured for the case m=15 and n=3. Adder circuit 401 receives quantities $A_0$ and $A_1$. Adder circuit 402 receives the quantities $A_3$ and $A_4$. Adder circuit receives the output of adder circuit 401 and the quantity $A_2$. Adder circuit 404 receives the outputs of adder circuits 402 and 403.

A wide variety of embodiments of adder trees consistent with expression (3), or with expression (6) in the case where m is a multiple of n, will be apparent to the reader in light of the various examples given herein.

Figure 5:
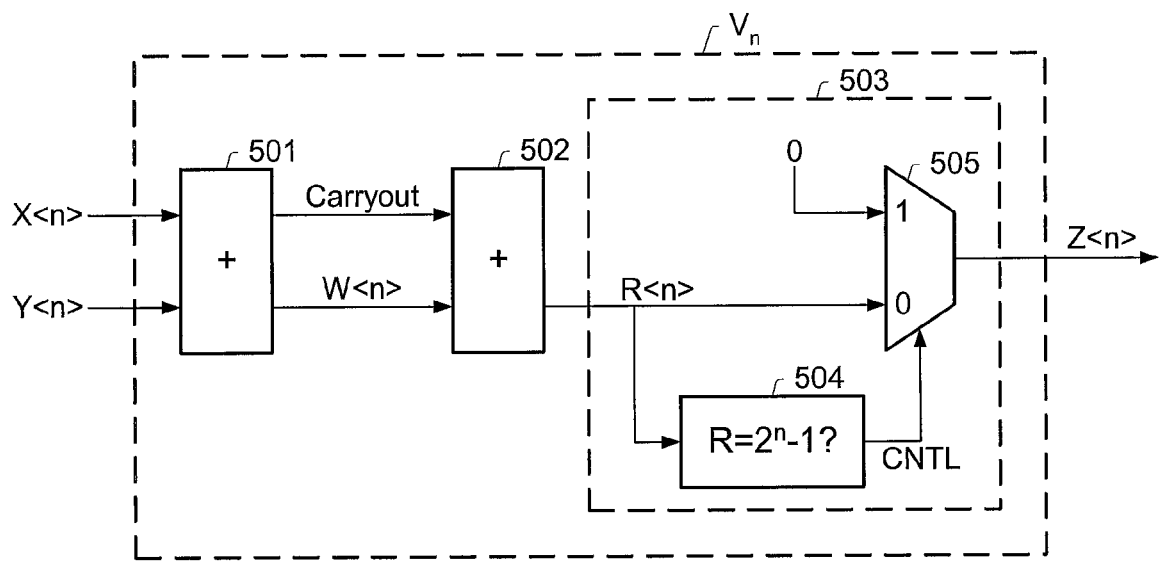
FIG. 5 illustrates one embodiment of an adder circuit $V_n$ configured to implement the computation $(X+Y)$ mod$(2^n-1)$ on two n bit operands X and Y.

As defined above, the adder circuit $V_n$ implements the computation $(X+Y) \bmod (2^n-1)$ on two n bit operands X and Y to produce an n-bit output Z. The adder circuit $V_n$ may be realized as illustrated in FIG. 5. The adder circuit $V_n$ may include two n-bit adders 501 and 502. Each n-bit adder is configured to operate on two n-bit operands to produce an n-bit output, using wrap as the overflow operation. The n-bit operands X and Y are supplied to the adder 501. The output W<n> of the adder 501 may be supplied to the adder 502. Furthermore, the carryout bit from the adder 501 may be supplied to the adder 502. The output R<n> from the adder 502 is supplied to a circuit 503 for selectively mapping the state $(2^n-1)$ to zero and for passing all other states of the output R. Thus, the adder circuit $V_n$ reports the result $(X+Y) \bmod (2^n-1)$. The circuit 503 may include a comparison unit 504 and a multiplexer 505. The comparison unit 504 may determine if the output R equals $2^n-1$ and asserts the control signal CNTL if so. The control signal CNTL may be coupled to the select input of the multiplexer 505. If the control signal is asserted, the multiplexer 505 selects the "1" input which is tied to zero. If the control signal is not asserted, the multiplexer 505 selects the "0" input which is coupled to the output R of the adder 502. Thus, the circuit 503 passes all states of the output R except for the state $R=2^n-1$; this exceptional state is mapped to zero. (The circuit 503 may be referred to herein as an exceptional-state mapping circuit or simply as a mapping circuit.) The output Z of the multiplexer 505 is the output of the adder circuit $V_n$.

Thus, the adder circuit $V_n$ generates the output Z according to the relations:

$$W<n> = (X+Y) \bmod 2^n \qquad (7)$$

$$R<n> = \begin{cases} W & \text{if } X+Y < 2^n \\ (W+1) & \text{if } X+Y \geq 2^n \end{cases} \qquad (8)$$

$$= (W + \text{carryout}) \bmod 2^n \qquad (9)$$

$$Z<n> = \begin{cases} 0 & \text{if } R = 2^n - 1 \\ R & \text{otherwise} \end{cases} \qquad (10)$$

Figure 6:
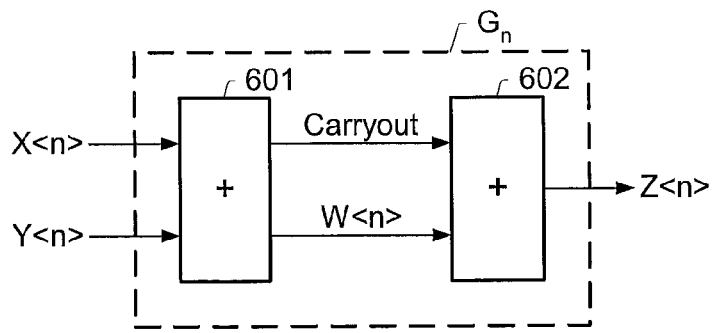
FIG. 6 illustrates one embodiment of a circuit $G_n$ including two n-bit adders.

In some embodiments, systems for computing $A \bmod (2^n-1)$ may be configured using copies of an adder circuit $G_n$ as illustrated in FIG. 6. Similar to the adder circuit $V_n$, the adder circuit $G_n$ includes two n-bit adders 601 and 602. However, in contrast to the adder circuit $V_n$, the adder circuit $G_n$ does not include an exceptional-state mapping circuit such as circuit 503. The adder 601 receives the n-bit operands X and Y and produces an n-bit output W. The output W and the carryout signal from the adder 601 are provided to the adder 602. The adder 602 generates the output Z. Thus, the adder circuit $G_n$ generates the output Z according to the relations:

$$W<n> = (X+Y) \bmod 2^n \qquad (11)$$

$$Z<n> = \begin{cases} W & \text{if } X+Y < 2^n \\ (W+1) & \text{if } X+Y \geq 2^n \end{cases} \qquad (12)$$

$$= (W + \text{carryout}) \bmod 2^n. \qquad (13)$$

Figure 7:
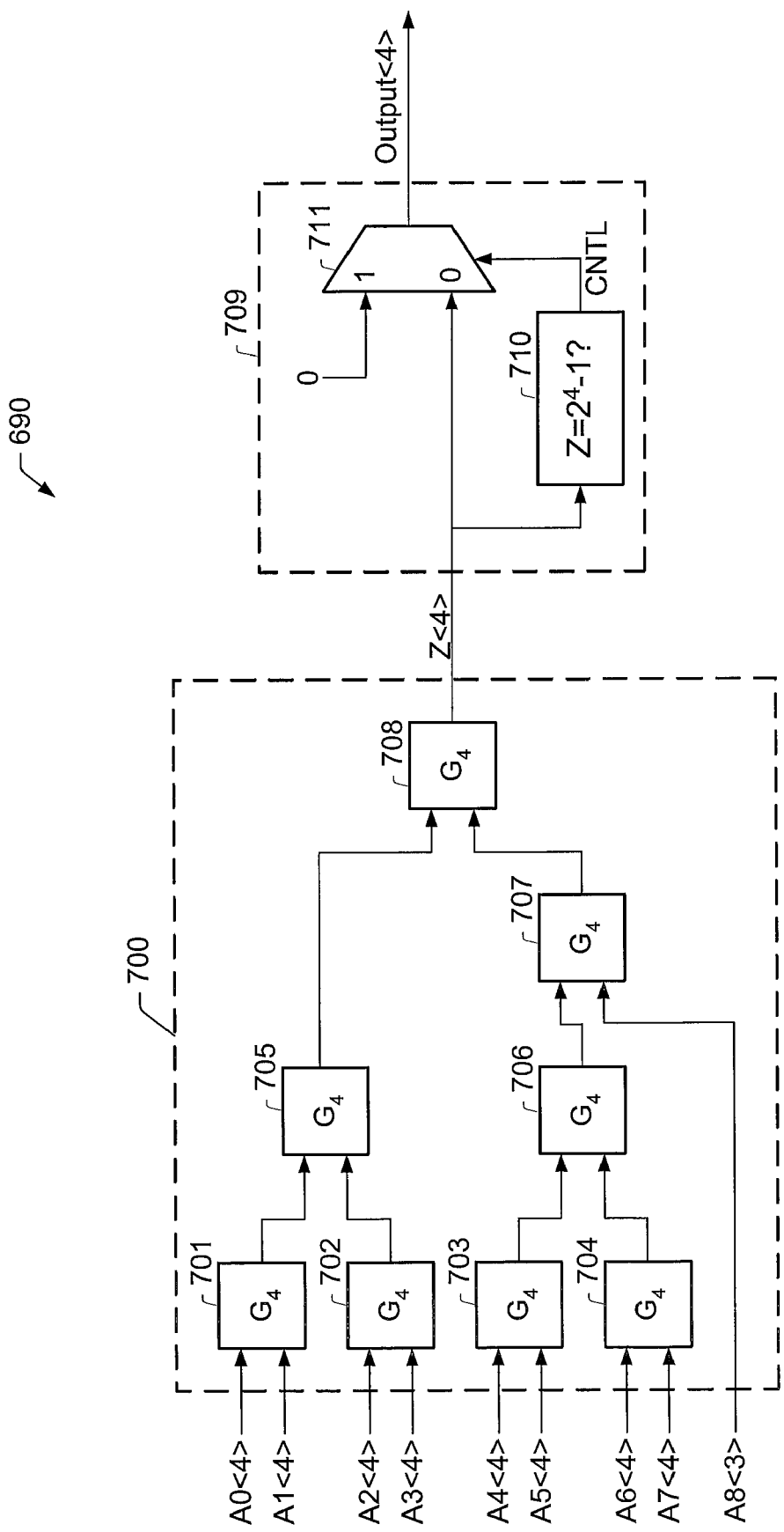
FIG. 7 illustrates one embodiment of an adder tree employing copies of the circuit $G_n$ in the case n=4.

FIG. 7 illustrates one embodiment of a system 690 for computing $A \bmod (2^n-1)$ including an adder tree 700. Adder tree 700 is configured using copies of adder circuit $G_n$ instead of copies of adder circuit $V_n$. The adder tree 700 is configured for the case m=35 and n=4. Each of the adder circuits 701, 702, 703 and 704 receive a corresponding pair of the quantities $A_0, A_1, A_2 \ldots, A_7$. Adder circuit 705 is provided with the outputs of adder circuits 701 and 702. Adder circuit 706 is provided with the outputs of adder circuits 703 and 704. Adder circuit 707 is provided with the output of adder circuit 706 and with the quantity $A_8$. Adder circuit 708 is provided with the outputs of adder circuits 705 and 707.

Note that the system 690 includes an exceptional-state mapping circuit 709 coupled to the output of adder tree 700 (i.e., the output of adder circuit 708) in order to complete the computation of $A \bmod (2^n-1)$. The mapping circuit 709 includes a control circuit 710 and a multiplexer 711. The adder circuit output Z is supplied to a control circuit 710 and to multiplexer 711. The control circuit 710 determines if the output Z equals $(2^4-1)$ and drives the control signal CNTL accordingly. Thus, the multiplexer 711 selects the value zero when $Z=2^4-1$ and selects the value Z otherwise. The output of the multiplexer 711 is the output of the system 690 and is equal to A mod (15).

The reader will observe that the structure of adder tree 700 is similar to the structure of adder tree 200 depicted in FIG. 2B. To arrive at adder tree 700, one can imagine replacing the adder circuits $V_4$ of adder tree 200 with adder circuits $G_4$. However, to complete the computation of $A \bmod (2^n-1)$, system 690 includes the mapping circuit 709 coupled to the output of the adder tree 700. Recall that the difference between the adder circuit $V_4$ and the adder circuit $G_4$ is the presence of a mapping circuit. Thus, system 690 performs the mapping function once at the output, whereas adder tree 200 performs the mapping function in each adder circuit. Because, system 690 does not duplicate the mapping circuit, it occupies less silicon area and consumes less power than adder tree 200.

The reader should note that any system embodiment of the kind described above in connection with FIGS. 2A-B, 3A-D and 4, i.e., having an adder tree T composed of copies of adder circuit $V_n$, may be alternatively realized by a structurally analogous adder tree T' and a mapping circuit coupled to the output of the adder tree T', where adder tree T' has the same structure of connections between adder circuit copies, but employs copies of adder circuit $G_n$ instead of copies of adder circuit $V_n$.

In some embodiments, a computer system may be configured to implement the computation of $A \bmod (2^n-1)$ in software. For example, a computer program may include instructions implementing the operations suggested by the following pseudo code:

```
X=0;
For (I=0, I<ceil(m/n), I++) {
    p = min ( n*(I+1)-1, (m-1) );
    Section=A[ p : n*I ];
    X=Section+X;
    If (X>2ⁿ-1) X=(X+1) mod (2ⁿ);
}
If (X==2ⁿ-1) X=0.
```

The notation "ceil(x)" denotes the ceiling function operating on the operand x. The notation "A[v:u]" represents the extraction of (v−u+1) consecutive bits from the quantity A, i.e., the bits starting at the $u^{th}$ bit position and ending at the $v^{th}$ bit position of A. The $0^{th}$ bit position designates the least significant bit of A. The final value of the variable X represents A mod ($2^n1$).

Figure 8:
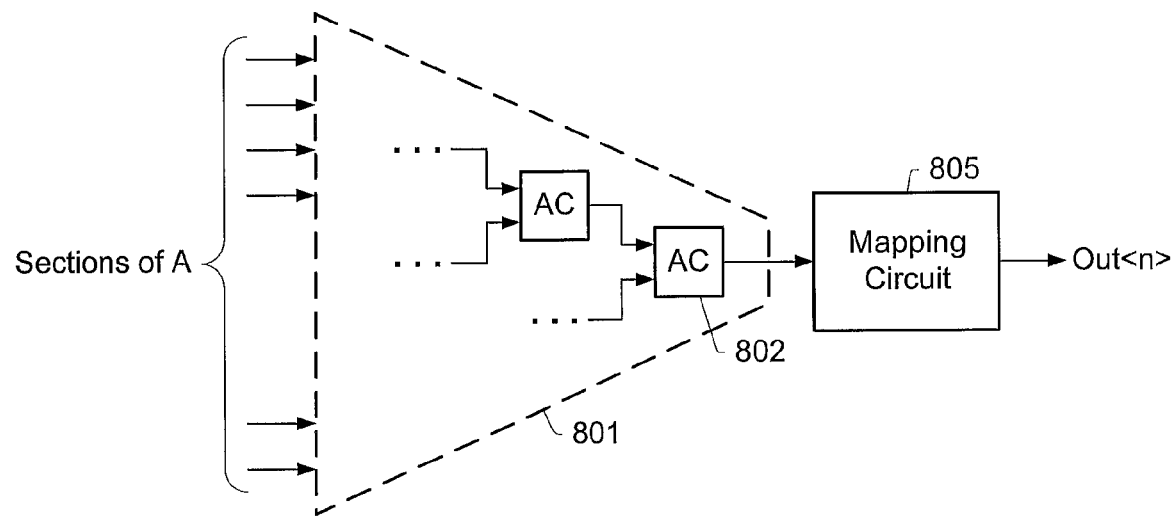
FIG. 8 illustrates one embodiment of a system for computing A mod $(2^n-1)$, the system including an adder tree structure and a mapping circuit.

In one set of embodiments, a system for computing A mod ($2^n-1$), where A is an m-bit quantity, where m is an integer greater than or equal to two, where n is a positive integer less than or equal to m, may include a plurality 801 of adder circuits AC as suggested in FIG. 8. Each of the adder circuits AC may be configured to operate on two n-bit operands in order to produce an n-bit output. The plurality of adder circuits may be coupled to form a tree structure. The quantity A is partitioned into a plurality of sections, where each of the sections includes up to n consecutive bits of the quantity A. Each of the sections is supplied to exactly one of the adder circuits in order to determine one of the two n-bit input operands of that adder circuit. Note, however, this does not imply that each of the adder circuits necessarily receives exactly one section. For example, in the embodiment of FIG. 7, observe that adder circuit 701 receives two sections, adder circuit 707 receives exactly one section, and adder circuit 708 receives zero sections.

Each of the adder circuits AC may include a first n-bit adder 601 and a second n-bit adder 602, e.g., as suggested in FIG. 6. The first n-bit adder may be configured to operate on the two n-bit operands in order to produce an intermediate n-bit result W. The second n-bit adder may be configured to operate on the intermediate n-bit result W and on a carryout signal from the first n-bit adder in order to produce the n-bit output Z.

The output of the adder circuit 802 corresponding to a root of the tree structure may be used in a wide variety of ways. For example, output of the adder circuit 802 may be used to perform data interleaving or deinterleaving. (See the more detailed description of interleaving/deinterleaving given below in connection with FIG. 10A.) As another example, the output of the adder circuit 802 may be used to perform encryption or decryption of data.

In some embodiments, the system may also include a mapping circuit 805. The mapping circuit may be coupled to receive the output from an adder circuit 802 of the plurality 801. The adder circuit 802 may correspond to a root of the tree structure. The mapping circuit 805 may be configured to operate on the output of adder circuit 802 in order to map a state $2^n-1$ to zero and to pass all other states of the adder circuit output. Thus, the output of the mapping circuit 805 may equal the value A mod ($2^n-1$).

The value A mod ($2^n-1$) may be used in a variety of ways. As suggested above, the value A mod ($2^n-1$) may be used for perform data interleaving or deinterleaving. Alternatively, the value A mod ($2^n-1$) may be used to perform data encryption or decryption.

Data flows through the tree structure from the section inputs towards the root adder circuit 802.

Various embodiments of the mapping circuit 805 are contemplated. In one embodiment, the mapping circuit may include a comparison unit and a multiplexer, e.g., as suggested by circuit 709 of FIG. 7. The comparison unit 710 may be configured to determine if the output of the adder circuit 802 is equal to $2^n-1$ and to assert a control signal CNTL in response determining that the adder circuit output is equal to $2^n-1$. The multiplexer 711 may be configured to select between the value zero and the adder circuit output based on the control signal.

If m is a multiple of n, it may be advantageous for each of the sections to be of length n bits. If m is not a multiple of n, it may be desirable to partition the quantity A into k=floor(m/n) sections of length n and one section of length (m−kn). For example, the section containing the most significant bits of A may be the section of length (m−kn).

In some embodiments, the tree structure has a number of levels equal to the ceiling of the base-2 logarithm of the ceiling of m/n.

In some embodiments, n is a positive integer in the range [2,32].

In some embodiments, n is a power of two. For example, n may equal 2, 4, 8, 16, 32, etc.

Figure 9:
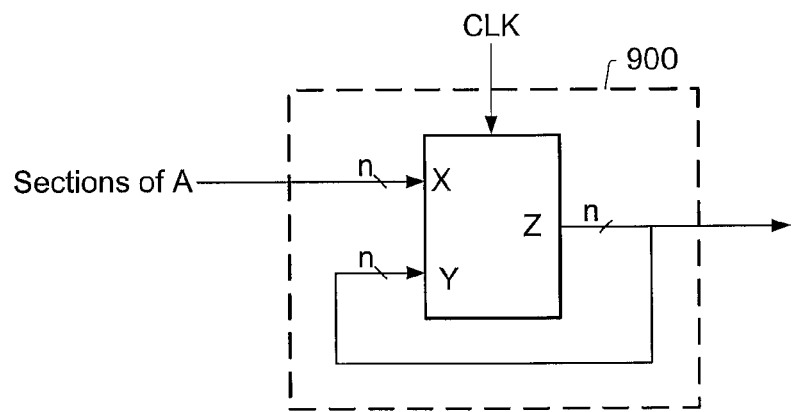
FIG. 9 illustrates one embodiment of a system for computing A mod $(2^n-1)$ in a number of computational cycles using feedback.

In one set of embodiments, a system for computing A mod ($2^n-1$), where A is an m-bit quantity, where m is an integer greater than or equal to two, where n is a positive integer less than or equal to m, may include an adder circuit, e.g., as suggested in FIG. 9. The adder circuit 900 may be configured to operate on two n-bit inputs (X and Y) and to produce an n-bit output (Z). The output Z of the adder circuit may be coupled to a first input (Y) of the two inputs.

The adder circuit 900 may include a first n-bit adder and a second n-bit adder, e.g., as suggested in FIG. 5 or FIG. 6. The first n-bit adder may be configured to operate on the two n-bit operands (X and Y) in order to produce an intermediate n-bit result W. The second n-bit adder may be configured to operate on the intermediate n-bit result W and on a carryout signal from the first n-bit adder in order to produce the n-bit output Z.

A plurality of sections of the quantity A may be sequentially presented to a second input (X) of the two inputs of adder circuit 900 in a plurality of cycles of the clock signal respectively. Each of the sections may include up to n consecutive bits of the quantity A.

The output of the adder circuit 900 after a last of the plurality of cycles may be used in a variety of ways. For example, the adder circuit output may be used to perform data interleaving or deinterleaving. Alternatively, the adder circuit output may be used as part of a data encryption operation or a decryption operation.

In some embodiments, the system may also include an extraction circuit configured to receive the m-bit quantity A, to extract the plurality of sections of the quantity A, and to supply the plurality of sections to the second input (X) in successive clock cycles respectively. Various embodiments of the extraction circuit are contemplated. In one embodiment, the extraction circuit may include a multiplexer, a register and a shift unit, e.g., as suggested in FIG. 1C. The multiplexer 51 may be configured to select between a first input port U and a second input port V, where the first input port U is coupled to receive the m-bit quantity A, where the second input port V is coupled to receive an output of the shift unit 53. The register 52 may be coupled to an output of the multiplexer. The shift unit may be coupled to an output of the register. The lowest n significant bits of the register output may be provided as output to the adder circuit 900.

The quantity A may be partitioned into sections, each having at most n bits, in a wide variety of ways. For example, if m is a multiple of n, it may be advantageous for each of the sections to be of length n bits. If m is not a multiple of n, it may be desirable to partition the quantity A into k=floor(m/n) sections of length n and one section of length (m−kn).

In some embodiments, the number of sections of the quantity A (i.e., the number of sections into which the quantity A is partitioned) is equal to the ceiling of m/n.

In some embodiments, the system also includes a mapping circuit configured to receive the n-bit output from the adder circuit 900, to operate on the adder circuit output to map a state $2^n-1$ to zero and to pass all other states of the adder circuit output. See for example, the mapping circuit 709 of FIG. 7. The output of the mapping circuit after a last of the plurality of cycles is equal to A mod ($2^n-1$). As suggested above, the value A mod ($2^n-1$) may be used in a variety of ways. For example, the value A mod ($2^n-1$) may be used to perform data interleaving or deinterleaving. Alternatively, the value A mod ($2^n-1$) may be used to perform data encryption or decryption.

In alternative embodiments, the adder circuit 900 may itself include a mapping circuit, e.g., as illustrated by the mapping circuit 503 in the adder circuit $V_n$ of FIG. 5. The mapping circuit may be configured to receive an n-bit result R generated by the second n-bit adder, to operate on the n-bit result R in order to obtain the n-bit output Z. The process of operating on the n-bit result may include mapping a state $2^n-1$ to zero and passing all other states of the result R. Thus, for this set of alternative embodiments, the output of the adder circuit 900 is equal to A mod ($2^n-1$).

Figure 10A:
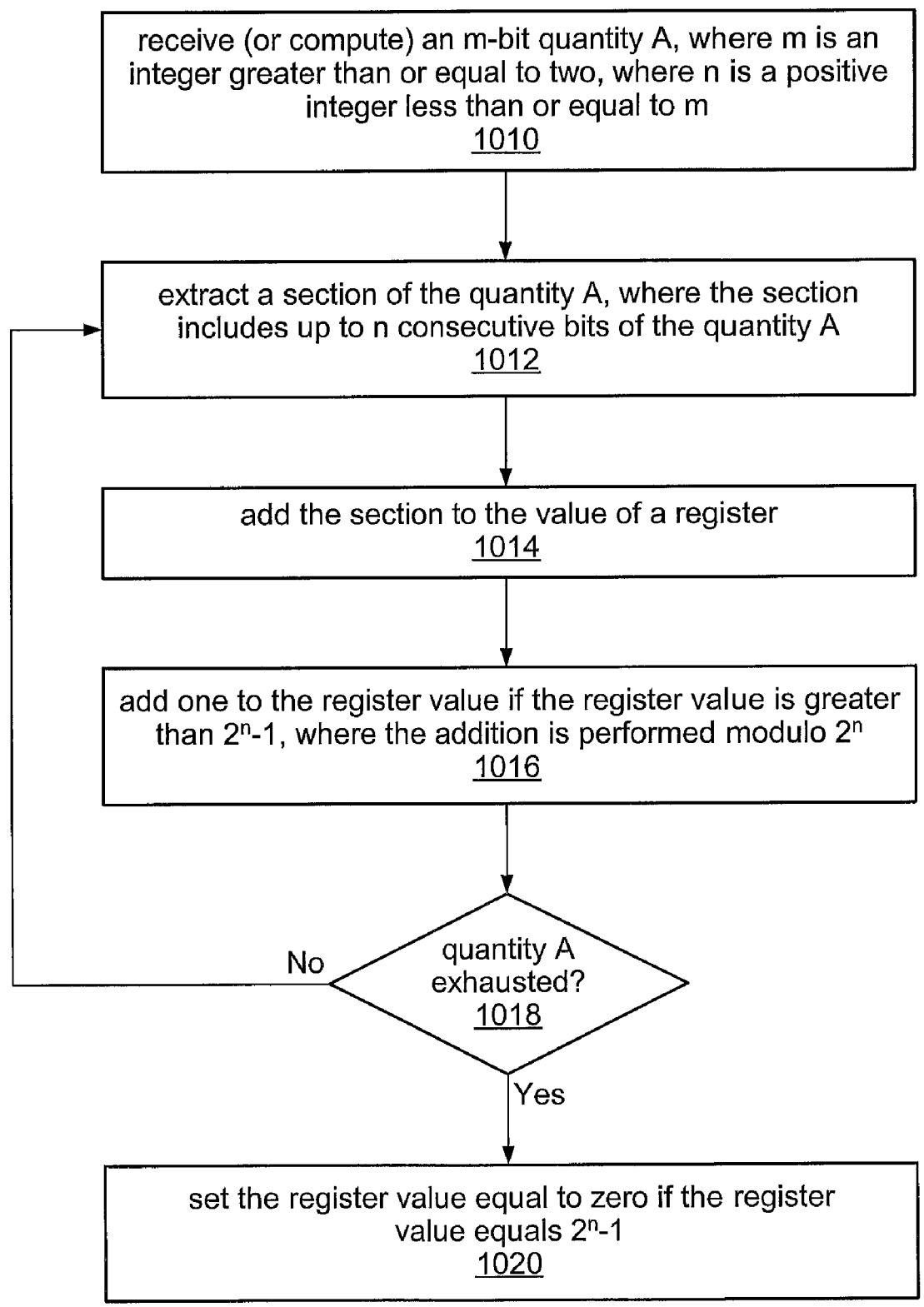
FIG. 10A illustrates one embodiment of a method (e.g., a computer-implemented method) for computing A mod $(2^n-1)$ in a sequential fashion.

In one set of embodiments, a method (e.g., a computer-implemented method) for computing A mod ($2^n-1$), where A is an m-bit quantity, m is an integer greater than or equal to two, and n is a positive integer less than or equal to m, may involve the following actions, as illustrated in FIG. 10A.

At 1010, the m-bit quantity A may be received (or generated by computation).

At 1012, a section of the quantity A may be extracted, where the section includes up to n consecutive bits of the quantity A.

At 1014, the section may be added to the value of a register, where the register is more than n bits in length.

At 1016, the register value may be incremented in response to a determination that the register value is greater than $2^n-1$, where the increment operation is performed modulo $2^n$.

At 1018, a test may be performed to determine if all m bits of the quantity A have been consumed. If not, the method returns to 1012 for another repetition of the loop (including 1012, 1014 and 1016) on a next section of the quantity A. Thus, actions 1012, 1014 and 1016 may be repeated until the quantity A is exhausted.

If the test determines that all m bits of the quantity A have been consumed, the method proceeds with 1020.

At 1020, the register value may be set equal to zero if the register value equals $2^n-1$. After 1020, the register value equals A mod ($2^n-1$).

The value A mod ($2^n-1$) may be used in any of a wide variety of ways. In one embodiment, the value A mod ($2^n-1$) may be used to compute a read address. The read address may used to read data from a memory medium (e.g., a data buffer) as part of an interleaving (or deinterleaving) operation. For example, in order to interleave a block of N data symbols, the data symbols may be written into an input buffer in sequential order and then read out from the input buffer in an interleaved order. In one embodiment, the read addresses for the interleaved order may be computed according to the following algorithm:

$$\text{For}(A=0, A<N, A++)RdAddr=f(A),$$

where f is a bijection (i.e., one-to-one function) on the set $\{0, 1, 2, \ldots, (N-2), (N-1)\}$. The computation of f(A) may involve the computation of A mod ($2^n-1$). (See, e.g., section 3.1.3.1.8.1.1 of the following standard: "Physical Layer Standard for cdma2000 Spread Spectrum Systems", 3GPP2 C.S0002-D, Version 1.0, Feb. 13, 2004.) The interleaved block of data may be transmitted through a channel. A receiver may then receive the interleaved block of data (possibly corrupted with noise) from the channel and perform a deinterleaving operation on the received data. The deinterleaving operation may similarly involve repeated computation of A mod ($2^n-1$) for different values of A.

Thus, the operations indicated in the method embodiment of FIG. 10A may be performed for each value in a sequence $\{A_k\}$ of m-bit values in order to generate read addresses for a data interleaving (or deinterleaving) operation.

In another embodiment, the value A mod ($2^n-1$) may be used as part of a data encryption (or decryption) operation on a block of data. Methods for performing encryption (or decryption) using the value A mod ($2^n-1$) are known in the field of encryption. A transmitter may transmit the encrypted data block through a channel (or store the encrypted data on a storage medium). A receiver may then receive the encrypted data block, possibly corrupted by noise, from the channel (or from the storage medium) and apply a decryption operation on the received block. The decryption operation may similarly involve the computation of A mod ($2^n-1$). Note that the value (or values) of A used in the encryption operation is (are) not necessarily the same as the value (or values) of A used in the decryption operation.

The quantity A may be partitioned into sections, each having at most n bits, in a wide variety of ways. For example, if m is a multiple of n, it may be advantageous for each of the sections to be of length n bits. If m is not a multiple of n, it may be desirable to partition the quantity A into k=floor(m/n) sections of length n and one section of length (m−kn).

In some embodiments, n is a positive integer in the range [2,32].

In some embodiments, n is a power of two. For example, n may equal 2, 4, 8, 16, 32, 64, 128, etc.

In various embodiments, the method may be enacted by a processor in response to the execution of program instructions stored in a memory. In one embodiment, the processor and memory are incorporated in a mobile phone.

In yet another set of embodiments, a method for computing A mod ($2^n-1$), where A is an m-bit quantity, where m is an integer greater than or equal to two, where n is a positive integer less than or equal to m, may involve the following actions, as illustrated in FIG. 10B.

As illustrated at 1050, in each of a plurality of stages, a corresponding set of n-bit input operands may be operated on to generate a corresponding set of one or more n-bit output operands. The action of operating on the set of n-bit input operands may include performing one or more addition operations (as described below) in parallel.

As illustrated at 1055, either (a) the value zero or (b) a first of the one or more output operands from a last of the stages may be selected depending on a comparison between the value ($2^n-1$) and the first output operand from the last stage. The selected value is equal to A mod ($2^n-1$).

In some embodiments, the last stage has only one output operand, i.e., the set of one or more output operands has only one member.

In each stage, each of the one or more addition operations may operate on a corresponding two of the set of n-bit input operands of that stage to generate a corresponding one of the set of n-bit output operands of that stage.

In a first of the stages, the set of n-bit input operands are determined by a plurality of sections of the quantity A respectively. Each of the sections includes at most n consecutive bits of the quantity A. (If a section is n bits long, the section may be directly provided as one of the input operands. If a section is less than n bits long, the section may be padded with zeros to form a corresponding one of the n-bit input operands.)

In each of the stages except for the first stage, the set of n-bit input operands may include one or more n-bit output operands supplied from one or more previous ones of the stages. (See the examples given in FIGS. 2A-B, 3A-C, 4 and 7.

In each of the stages, each of the one or more addition operations includes: adding the corresponding two n-bit input operands to form an n-bit intermediate result and a carryout; and adding the n-bit intermediate result and the carryout to form the corresponding n-bit output operand.

In some embodiments, the method may include additional actions after performing actions 1050 and 1055, e.g., as illustrated in FIG. 10C.

At 1057, a read address may be generated using the selected value.

At 1059, a data symbol may be read (i.e., accessed) from a data buffer using the read address.

Furthermore, in one embodiment, the m-bit quantity A may be varied through a range of values, and actions 1050 through 1059 may be performed for each value of the m-bit quantity A (in the range of values) in order to implement an interleaving operation (or a deinterleaving operation) on data symbols stored in the data buffer.

In alternative embodiments, the actions 1050 and 1055 may be performed as part of an encryption operation or a decryption operation on a block of data.

FIG. 11 is a block diagram representing one set of embodiments of a computer system 1082. The computer system 1082 may include at least one central processing unit CPU 1160 (i.e., processor) which is coupled to a host bus 1162. The CPU 1160 may be any of various types, including, but not limited to, an x86 processor, a PowerPC processor, a CPU from the SPARC family of RISC processors, as well as others. A memory medium, typically including semiconductor RAM, and referred to herein as main memory 1166, may be coupled to the host bus 1162 by means of memory controller 1164. The main memory 1166 may store programs operable to implement any or all or any portion of the various method embodiments described herein. The main memory may also store operating system software, as well as other software for operation of the computer system.

The host bus 1162 may couple to an expansion or input/output bus 1170 through a bus controller 1168 or bus bridge logic. In some embodiments, the expansion bus 1170 may include slots for various devices such as a video card 1180, a hard drive 1182, storage devices 1190 (such as a CD-ROM drive, a tape drive, a floppy drive, etc.) and a network interface 1122. The video card 1180 may couple to a display device such as a monitor, a projector, or a head mounted display. The network interface 1122 (e.g., an Ethernet device) may be used to communicate with other computers through a network.

The computer system 1082 may also include one or more I/O devices 1192 such as a mouse, a keyboard, one or more microphones, and one or more speakers, a touch sensitive pad, etc.

Embodiments of computer system 1082 targeted for use as a server computer may be more richly endowed with processor capacity (e.g., having multiple processors), memory capacity and network access bandwidth than embodiments targeted for use as a client computer. The client computer may include the mouse, keyboard, speakers and video card (or graphics accelerator), whereas a server computer does not necessarily include these items.

Various embodiments are described above for computing A mod ($2^n-1$) in a sequential fashion using a single adder circuit or in a parallel fashion using an adder tree. The present invention contemplates combinations of these embodiments where the value A mod ($2^n-1$) is computed partially in a sequential fashion and partially in a parallel fashion. For example, if the number c of sections of the quantity A is greater than number $n_1$ of inputs to an adder tree, the c sections may be divided in groups, e.g., groups of size at most ($n_1-1$). The groups may be supplied to the adder tree in successive cycles. The output of the adder tree may be coupled to one of the n, adder tree inputs. The remaining ($n_1-1$) inputs may be configured to receive the ($n_1-1$) sections of each group.

Any of the various method embodiments disclosed herein (or any combinations thereof or portions thereof) may be implemented in terms of program instructions. The program instructions may be stored in (or on) any of various memory media. A memory medium is a medium configured for the storage of information. Examples of memory media include various kinds of magnetic media (e.g., magnetic tape or magnetic disk); various kinds of optical media (e.g., CD-ROM); various kinds of semiconductor RAM and ROM; various media based on the storage of electrical charge or other physical quantities; etc.

Furthermore, various embodiments of a system including a memory and a processor are contemplated, where the memory is configured to store program instructions and the processor is configured to read and execute the program instructions from the memory. In various embodiments, the program instructions encode corresponding ones of the method embodiments described herein (or combinations thereof or portions thereof).

Various embodiments may further include receiving, sending or storing program instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method actions may be changed, and various actions may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

The invention claimed is:

1. A system for computing A mod($2^n-1$), wherein A is an m-bit quantity, wherein m is an integer greater than or equal to two, wherein n is a positive integer less than or equal to m, the system comprising:

a plurality of adder circuits, wherein each of the adder circuits is configured to operate on two n-bit operands in order to produce an n-bit output, wherein the plurality of adder circuits are coupled to form a tree structure, wherein the quantity A is partitioned into a plurality of sections, wherein each of the sections includes up to n consecutive bits of the quantity A, wherein each of the sections is supplied to exactly one of the adder circuits in order to determine one of the two n-bit operands of that adder circuit, wherein each of the adder circuits includes:

a first n-bit adder configured to operate on the two n-bit operands in order to produce an intermediate n-bit result; and a second n-bit adder configured to operate on the intermediate n-bit result and on a carryout signal from the first n-bit adder in order to produce the n-bit output.

2. The system of claim 1 further comprising:

a mapping circuit configured to receive the output from a first of the adder circuits, wherein the first adder circuit corresponds to a root of the tree structure, wherein the mapping circuit is configured to operate on the first adder output to map a state $2^n-1$ to zero and to pass all other states of the first adder output.

3. The system of claim 2, wherein the mapping circuit includes a comparison unit and a multiplexer, wherein the comparison unit is configured to determine if said first adder output is equal to $2^n-1$ and to assert a control signal in response to determining that the first adder output is equal to $2^n-1$, wherein the multiplexer is configured to select between the value zero and the first adder output based on the control signal.

4. The system of claim 1, wherein either:
(a) m is a multiple of n, and each of the sections is n bits in length; or
(b) m is not a multiple of n, each of the sections except for one is n bits in length, and the exceptional section has length equal to (m−zn) with z being a positive integer.

5. The system of claim 1, wherein the tree structure has a number of levels equal to the ceiling of the base-2 logarithm of the ceiling of m/n.

6. A system for computing $A \bmod(2^n-1)$, wherein A is an m-bit quantity, wherein m is an integer greater than or equal to two, wherein n is a positive integer less than or equal to m, the system comprising:

an adder circuit having two n-bit inputs and an n-bit output, wherein the adder circuit is configured to operate on two n-bit operands presented respectively at the two inputs and to produce an n-bit result at the output, wherein the output is coupled to a first of the two inputs, wherein the adder circuit includes:
    a first n-bit adder configured to operate on the two n-bit operands in order to produce an intermediate n-bit value; and
    a second n-bit adder configured to operate on the intermediate n-bit value and on a carryout signal from the first n-bit adder in order to produce the n-bit result;
wherein a plurality of sections of the quantity A are presented to a second of the two inputs in a respective plurality of cycles of a clock signal, wherein each of the sections includes up to n consecutive bits of the quantity A.

7. The system of claim 6 further comprising:
an extraction circuit configured to receive the m-bit quantity A, to extract the plurality of sections of the quantity A, and to supply the plurality of sections to the second input of the adder circuit in successive clock cycles, respectively.

8. The system of claim 7, wherein the extraction circuit includes a multiplexer, a register and a shift unit, wherein the multiplexer includes a first input port and a second input port, wherein the multiplexer is configured to select between the first input port and the second input port, wherein the first input port is coupled to receive the m-bit quantity A, wherein the second input port is coupled to receive an output of the shift unit, wherein the register is coupled to an output of the multiplexer, wherein the shift unit is coupled to an output of the register.

9. The system of claim 6, wherein either:
(a) m is a multiple of n and each of the sections is n bits in length; or
(b) m is not a multiple of n, each of the sections except for one is n bits in length, and the exceptional section has length equal to (m−zn) with z being a positive integer.

10. The system of claim 6 further comprising a mapping circuit configured to:
receive the n-bit result from the adder circuit; and
operate on the n-bit result to map the state $2^n-1$ to zero and to pass all other states of the n-bit result.

11. The system of claim 6, wherein the number c of sections in said plurality of sections is equal to the ceiling of m/n.

12. The system of claim 11, wherein the system is configured to complete computation of $A \bmod(2^n-1)$ in c of said cycles.

13. The system of claim 6, wherein the adder circuit also includes:
a mapping circuit configured to receive the n-bit result produced by the second n-bit adder, to operate on the n-bit result in order to obtain an n-bit map value, wherein said operating includes mapping the state $2^n-1$ to zero and passing all other states of the n-bit result.

14. A method for computing $A \bmod(2^n-1)$, wherein A is an m-bit quantity, wherein m is an integer greater than or equal to two, wherein n is a positive integer less than or equal to m, the method comprising:
(a) a computer system extracting a section of the m-bit quantity A, wherein the section includes up to n consecutive bits of the quantity A, wherein the computer system comprises a processor and a memory;
(b) the computer system updating a value in a register by adding the section to the value in the register;
(c) the computer system conditionally modifying the value in the register by adding one to the value in the register if the value in the register is greater than $2^n-1$, wherein said adding of one is performed modulo $2^n$;
(d) the computer system repeating (a), (b) and (c) until the quantity A is exhausted;
(e) the computer system setting the value in the register equal to zero if the value in the register equals $2^n-1$.

15. The method of claim 14 further comprising:
(f) generating a read address using the value in the register; and
(g) reading a data symbol from a data buffer using the read address.

16. The method of claim 15 further comprising:
successively setting the m-bit quantity A to each integer value in a range of integer values; and
performing (a) through (g) for each integer value of the m-bit quantity A in order to implement an interleaving operation or a deinterleaving operation on data symbols stored in the data buffer.

17. The method of claim 14, wherein (a) through (e) are performed as part of an encryption operation or a decryption operation on a block of data.

18. The method of claim 14, wherein m is a multiple of n, wherein the section extracted in (a) is n bits in length.

19. A method for computing $A \bmod(2^n-1)$, wherein A is an m-bit quantity, wherein m is an integer greater than or equal to two, wherein n is a positive integer less than or equal to m, the method comprising:
(a) an adder tree performing a number of addition operations, wherein said performing the number of addition operations includes a sequence of stages within the adder tree performing respective subsets of the addition operations, wherein each of the stages performs the respective subset of the number of addition operations in a parallel fashion, wherein the subset of addition operations performed by each stage receives corresponding input data and generates corresponding output data, wherein the input data of each stage, except for a first of the stages, comprises at least a portion of the output data of a previous one of the stages, wherein the input data of the first stage includes a plurality of sections of the quantity A, wherein each of the sections includes at most n consecutive bits of the quantity A, wherein each of said number of addition operations includes performing a first n-bit addition and a second n-bit addition, wherein the second n-bit addition operates on an intermediate result and a carryout produced by the first n-bit addition;

(b) a mapping circuit selecting either the value zero or the output data from a last of the stages depending on a comparison of the value $(2^n-1)$ and said output data from the last stage, wherein the selected value equals A mod $(2^n-1)$.

20. The method of claim 19, wherein the input data of one of the stages, other than the first stage, includes an additional section of the quantity A, wherein said additional section is not included in said plurality of sections.

21. The method of claim 19 further comprising: distributing the plurality of sections of the quantity A to the subset of addition operations of the first stage.

22. The method of claim 19 further comprising:
(c) generating a read address using the selected value; and
(d) reading a data symbol from a data buffer using the read address.

23. The method of claim 22 further comprising:
successively setting the m-bit quantity A equal to each integer value in a range of integer values; and
performing (a) through (d) for each integer value of the m-bit quantity A in order to implement an interleaving operation or a deinterleaving operation on data symbols stored in the data buffer.

24. The method of claim 19, wherein (a) and (b) are performed as part of an encryption operation or a decryption operation on a block of data.

* * * * *